(12) United States Patent
Cantrill

(10) Patent No.: US 6,944,722 B2
(45) Date of Patent: Sep. 13, 2005

(54) METHOD AND SYSTEM FOR POSTMORTEM IDENTIFICATION OF FALSELY SHARED MEMORY OBJECTS

(75) Inventor: Bryan Cantrill, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 331 days.

(21) Appl. No.: 10/413,931

(22) Filed: Apr. 14, 2003

(65) Prior Publication Data

US 2004/0205302 A1 Oct. 14, 2004

(51) Int. Cl.[7] .............................................. G06F 12/00
(52) U.S. Cl. ................... 711/147; 707/103 R
(58) Field of Search ..................... 711/141, 147, 711/150, 152, 163, 168; 707/103, 104.1, 201; 717/107–108, 116, 144, 149, 164–165

(56) References Cited

U.S. PATENT DOCUMENTS

| | | | | |
|---|---|---|---|---|
| 4,689,739 A | * | 8/1987 | Federico et al. ............ | 710/264 |
| 5,699,500 A | * | 12/1997 | Dasgupta ..................... | 714/1 |
| 5,752,249 A | * | 5/1998 | Macon et al. ............ | 707/103 R |
| 6,523,141 B1 | * | 2/2003 | Cantrill ........................ | 714/48 |
| 6,581,156 B1 | * | 6/2003 | Meyer ......................... | 712/244 |
| 6,753,873 B2 | * | 6/2004 | Dixon et al. ................. | 345/542 |
| 6,813,522 B1 | * | 11/2004 | Schwarm et al. ............. | 700/5 |
| 6,886,081 B2 | * | 4/2005 | Harres ........................ | 711/152 |

* cited by examiner

*Primary Examiner*—Nasser Moazzami
(74) *Attorney, Agent, or Firm*—Martine Penilla & Gencarella, LLP

(57) ABSTRACT

A method for utilizing postmortem object type identification to identify falsely shared memory objects is disclosed. In one method embodiment, the present invention accesses a postmortem object type identification containing type identifications for known nodes and inferred nodes. Next, an iteration for array nodes is performed on the postmortem object type identification. Then a list of the array nodes is generated, wherein the array nodes on the list are potential false sharing objects.

23 Claims, 16 Drawing Sheets

| | | |
|---|---|---|
| typegraph: | pass => 2 | |
| typegraph: | nodes => 140638 | |
| typegraph: | unmarked => 96110 | (68.3%) |
| typegraph: | known => 6890 | ( 4.8%) |
| typegraph: | conjectured => 117367 | (83.4%) |
| typegraph: | conjectured fragments => 370 | ( 0.2%) |
| typegraph: | known or conjectured => 124627 | (88.6%) |
| typegraph: | conflicts => 1740 | |
| typegraph: | time elapsed, this pass => 13 seconds | |
| typegraph: | time elapsed, total => 38 seconds | |

> de7ae628: :whattype
de7ae628 is de7ae628+0, possibly struct swapnode

> dea4a3c0: :whattype
dea4a3c0 is dea4a3c0+0, struct seg

FIG. 6C

> de7ae628: :whattype -v

675

| BASE | LIMIT | TYPE | | | SIZE | REACH | MARKED |
|---|---|---|---|---|---|---|---|
| de7ae628 | de7ae688 | <unknown> | | | -1 | 0 | yes |

| INFERENCE | FROM | SRCOFFS | REFTYPE | REFMEMBER |
|---|---|---|---|---|
| struct swapnode | de797d88 | 44 | struct swapnode * | |

| FRAGMENT | FROM | SRCOFFS | REFTYPE | REFMEMBER |
|---|---|---|---|---|
| struct vnode | df114008 | 0 | struct anon | an_vp |

| FROM | SRCOFFS | DESTOFFS | MARKED | STATUS | REACH |
|---|---|---|---|---|---|
| de797d88 | 44 | 0 | yes | Infered | 0 |
| fec1a700 | 2e0 | 8 | yes | known | 0 |

| TO | SRCOFFS | DESTOFFS | MARKED | STATUS | REACH |
|---|---|---|---|---|---|
| de7ae628 | 3c | 0 | yes | infered | 0 |
| de7ae628 | 30 | 8 | yes | infered | 0 |
| de7ae628 | 2c | 8 | yes | infered | 0 |

Output of possible false sharing array nodes:

| Known or inferred array | Elements<than granularity | Total size>granularity | Parallel |
|---|---|---|---|
| de7ae628 | yes | yes | yes |
| fec1a700 | yes | yes | no |
| de7ae688 | yes | no | no |
| dea4a3c0 | no | no | no |

FIG. 11A

> : :findfalse

| ADDR | TYPE | | SZ | TOTSIZE |
|---|---|---|---|---|
| 30000c07c40 | struct | fifolock | 32 | 288 |
| 30000c07b20 | struct | fifolock | 32 | 288 |
| 30000c07a00 | struct | fifolock | 32 | 288 |
| 30000b70000 | struct | icf_s | 16 | 8192 |
| 30000b6c000 | struct | icf_s | 16 | 8192 |
| 30000b62000 | struct | tbf_s | 16 | 8192 |
| 300008d1000 | struct | mutex | 8 | 4096 |
| 30004153530 | struct | uf_entry | 40 | 2688 |
| 3000284eaa8 | struct | uf_entry | 40 | 2688 |
| 30000c00020 | struct | uf_entry | 40 | 2688 |
| 3000256f9c0 | struct | uf_entry | 40 | 1312 |
| 3000256f4a0 | struct | uf_entry | 40 | 1312 |
| 3000256ef80 | struct | uf_entry | 40 | 1312 |
| 3000256ea60 | struct | uf_entry | 40 | 1312 |
| 3000256e540 | struct | uf_entry | 40 | 1312 |
| 300011da538 | struct | uf_entry | 40 | 1312 |
| 300011da018 | struct | uf_entry | 40 | 1312 |
| 300026599c8 | struct | uf_entry | 40 | 1312 |
| 30000061988 | struct | smfree | 24 | 192 |
| 30000ca0000 | struct | irb | 32 | 65536 |
| 30000ae6000 | struct | mutex | 8 | 262144 |
| 30000920000 | struct | plock | 8 | 124624 |
| 30000916000 | struct | _kcondvar | 2 | 31156 |

METHOD AND SYSTEM FOR POSTMORTEM IDENTIFICATION OF FALSELY SHARED MEMORY OBJECTS

FIELD OF THE INVENTION

The present invention relates to the field of postmortem object identification. Specifically, the present invention relates to the use of postmortem identification process for locating falsely shared memory objects.

BACKGROUND ART

Presently, computer systems and the operation thereof are utilized in all facets of modern life. Accordingly, there is a need for many different types of software to operate on computer systems. However, with the mix of operating systems and the software operating thereon, the probability of technical errors and computer system crashes and/or slow downs are high.

Coherence is a constraint in any SMP (symmetric multi-processing) architecture. Memory in caching SMP systems must be kept coherent. For example, in caching SMP systems there are two or more computing devices (e.g., central processing units (CPU's)) accessing any number of cache lines. Thus, it is necessary that if one of the CPU's writes something to data, another CPU will subsequently be able to read from the same data and get the results that the first CPU wrote.

For example, with reference to the caching SMP system 100 of FIG. 1, a normal CPU (e.g., 105, 107, or 109 of FIG. 1) has a cache (e.g., cache 110, 113, or 115) that is accessible via a bus 150. In general, each cache (or line within a cache) has an idea of ownership. When a load is performed from a certain address, the load of data goes into the cache and an amount of ownership is associated with the data. For example, if a read is performed on the data in the cache line, the ownership may be shared. That is, if one CPU (e.g., 105) reads from a specific cache line (e.g., cache 113 line b) that data is marked as shared and no action is performed on it. However, if CPU 105 performs a write, then the status of the data from cache 113 line b needs to be changed from shared to exclusive. That way, no other CPU (e.g., 107 or 109) can make simultaneous changes to the data which may result in the line of data being corrupted or a system error to occur.

However, if a cache line contains a memory object such as an array of structures, another sharing method may be involved. For example, if there is an array of structures in cache 113 line b. One thread (e.g., CPU 105) may access a first element in the structure, a second thread (e.g., CPU 107) may access a second element in the structure, and a third thread (e.g., CPU 109) may access a third element in the structure. Thus, three elements within the array may be accessed at the same time. Furthermore, each of the elements may be manipulated and the data may increment per element without error. In addition, since the elements of the array are parallel data structures with disjoint data elements, the three users are not interfering and in many cases the software will scale the effect. That is, with three CPU's accessing three distinct elements, the operations will occur three times faster than if just one CPU was accessing one element.

However, a deleterious effect may occur with the above stated array structure when the element size of the array structure is less than the size of the cache line. For example, if the size of the element is 16 bytes and the size of the cache line (e.g., cache 113 line b) is 64 bytes. Then all three structures may live on the same cache line (e.g., cache 113 line b). Therefore, although the array structure has been designed so that the three users accessing the elements don't interfere (e.g., no fighting is done over the elements of the array), there is fighting between the single cache line (e.g., cache 113 line b). For example, each CPU may be fighting for ownership of the cache line. This fighting degrades performance considerably, and progress may be made as though only one CPU were operating at a time instead of all three. This is known as false sharing.

In general, false sharing is extremely difficult to detect due to the fact that contention in a system is recognized by finding contention within the hardware of a system and not contention with the software. For example, since each of the three CPU's are editing their own data elements within the array structure, they each have their own lock on the data and no contention between the locks on the data is occurring. However, because they are all mapped to the same cache line, the bus is being overused and inter-device fighting is occurring.

Thus, false sharing is normally found when it has already become a problem, and the resolution of false sharing normally occurs with keen intuition and good luck. For example, when a performance problem is encountered and is reduced to a lack of sufficient parallelism, it is intuition to look for fault sharing. Furthermore, it takes an amount of good luck to find the right structure.

SUMMARY OF INVENTION

The present invention provides, in various embodiments, a method and system for using postmortem identification process for locating falsely shared memory objects in a memory or "crash" dump. Furthermore, embodiments of the present invention provide a method and system for postmortem identification of falsely shared memory objects which finds false sharing before it noticeably affects the operating system. Additionally, the present invention provides a method and system for postmortem identification of falsely shared memory objects which is cost efficient and time saving.

In one embodiment, the present invention provides information about false sharing before the situation adversely effects the computing system. In general, by establishing a graph (or chart) of the type of the nodes within the memory dump, the technician can search for situations of false sharing occurring anywhere within the memory dump. For example, while the memory dump is analyzed in order to provide a specific subsystem to search for the error, a simultaneous evaluation of false sharing can be performed.

In one embodiment, the present invention utilizes postmortem object type identification to identify falsely shared memory objects. In one method embodiment, the present invention accesses a postmortem object type identification containing type identifications for known nodes and inferred nodes. Next, an iteration for array nodes is performed on the postmortem object type identification. Then a list of the array nodes is generated, wherein the array nodes on the list are potential false sharing objects.

In general, the present invention allows a technician to utilize the postmortem type information as a mechanism for detecting previously unknown cases of false sharing. That is, the postmortem analysis may be used to analyze a system crash dump for potential performance problems. In one embodiment, the present invention works by first performing the passes described in postmortem object type identification. After the process is run, an iteration of all the nodes may be conducted to find nodes that satisfy at least a portion of false sharing criteria. One criteria is that the node in question should be an array node. That is, the node is either a known array node or an inferred array node. A second criteria may be that some elements of the array structure should be smaller than the coherence granularity (cache line size). Another criteria may be that the total size of the array should be larger than the coherence granularity. Yet another criteria may be that some elements within the array should contain a synchronization primitive (e.g., mutex, readers/ writers lock, condition variable or semaphore). Any node satisfying any or all of these criteria may be identified as an object that could potentially suffer from false sharing, and the nodes address, symbolic name (if any), type, type size, and/or total size may be provided as output.

BRIEF DESCRIPTION OF THE DRAWINGS

The accompanying drawings, which are incorporated in and form a part of this specification, illustrate embodiments of the invention and, together with the description, serve to explain the principles of the invention.

PRIOR ART

FIG. 6A is an exemplary report of the possible results of a processed memory dump in accordance with one embodiment of the present invention.

FIG. 6B is an exemplary result of a "::whattype" protocol in accordance with one embodiment of the present invention.

FIG. 6C is another exemplary result of a "::whattype" protocol in accordance with one embodiment of the present invention.

FIG. 6D is an exemplary verbose version of a "::whattype" protocol in accordance with one embodiment of the present invention.

FIG. 11A is an exemplary report of the possible results of a postmortem identification of falsely shared memory objects in accordance with one embodiment of the present invention.

FIG. 11B is another exemplary report of the possible results of a postmortem identification of falsely shared memory objects in accordance with one embodiment of the present invention.

DETAILED DESCRIPTION OF THE INVENTION

Figure 1:
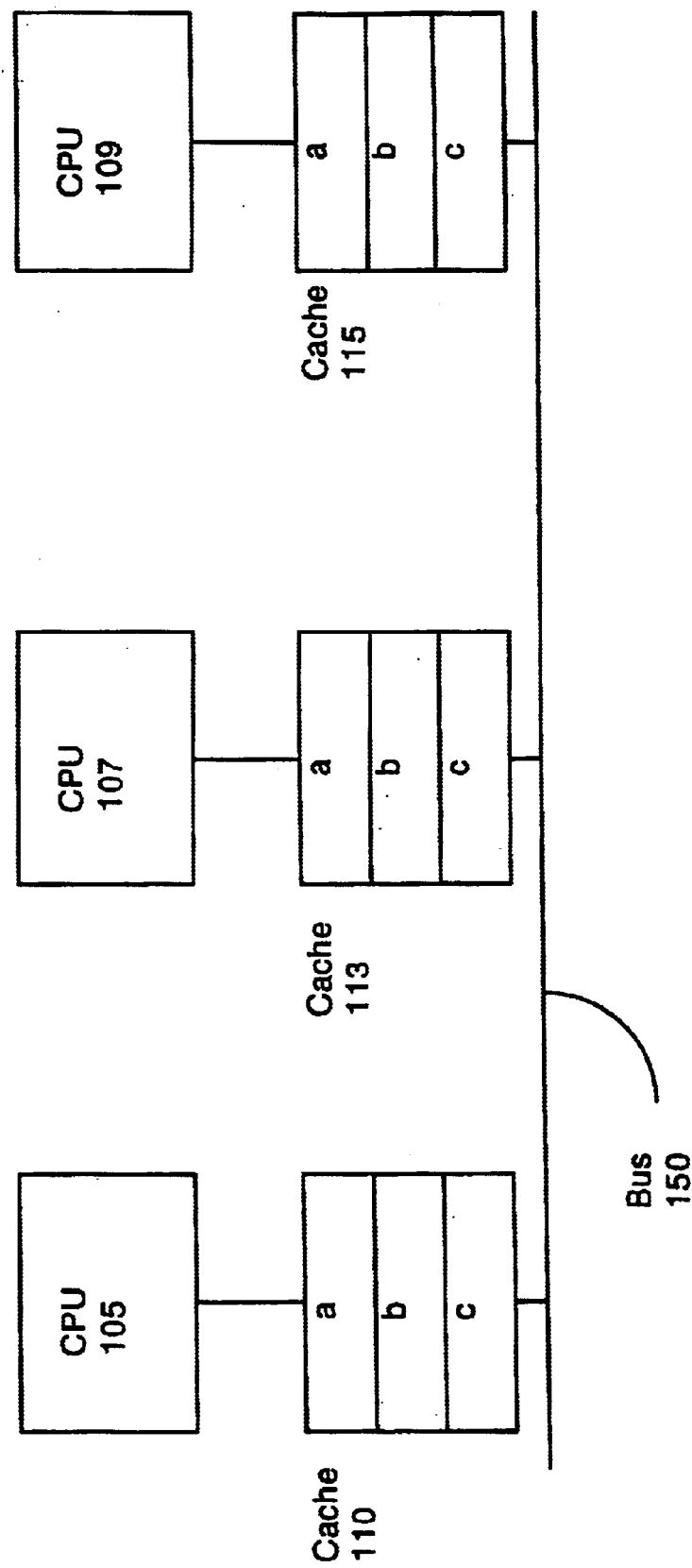
FIG. 1 is a block diagram of a caching symmetric multi-processing (SMP) system within a network.

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well-known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within an electronic computing device and/or memory system. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "partitioning", "receiving", "processing", "creating", "storing", "utilizing", "accessing", "generating", "providing", "separating", "enqueuing", "dequeuing", "performing", "marking" or the like, refer to the action and processes of a computer system, or similar electronic computing device, that manipulates and transforms data. The data is represented as physical (electronic) quantities within the computing device's registers and memories and is transformed into other data similarly represented as physical quantities within the computing device's memories or registers or other such information storage, transmission, or display devices.

The discussion of the present invention will begin with the initial description of the postmortem object type identification process. The discussion will then cover embodiments of the present invention for locating possible cases of false sharing by using the results of the postmortem object type identification process. For example, in one embodiment, the postmortem object type identification may be performed and then the process for locating falsely shared memory objects may be performed on the postmortem object type identification data. In another embodiment, the postmortem object type identification process may have been performed and the search for falsely shared memory objects may be conducted at a later time on the postmortem object type identification data.

Additional details on an exemplary implementation of the postmortem object type identification process are set forth in commonly-owned U.S. patent application Ser. No. 10/346423 filed Jan. 16, 2003, entitled "METHOD AND SYSTEM FOR POSTMORTEM OBJECT TYPE IDENTIFICATION", which is hereby incorporated by this reference.

I. Postmortem Object Type Identification

Figure 2:
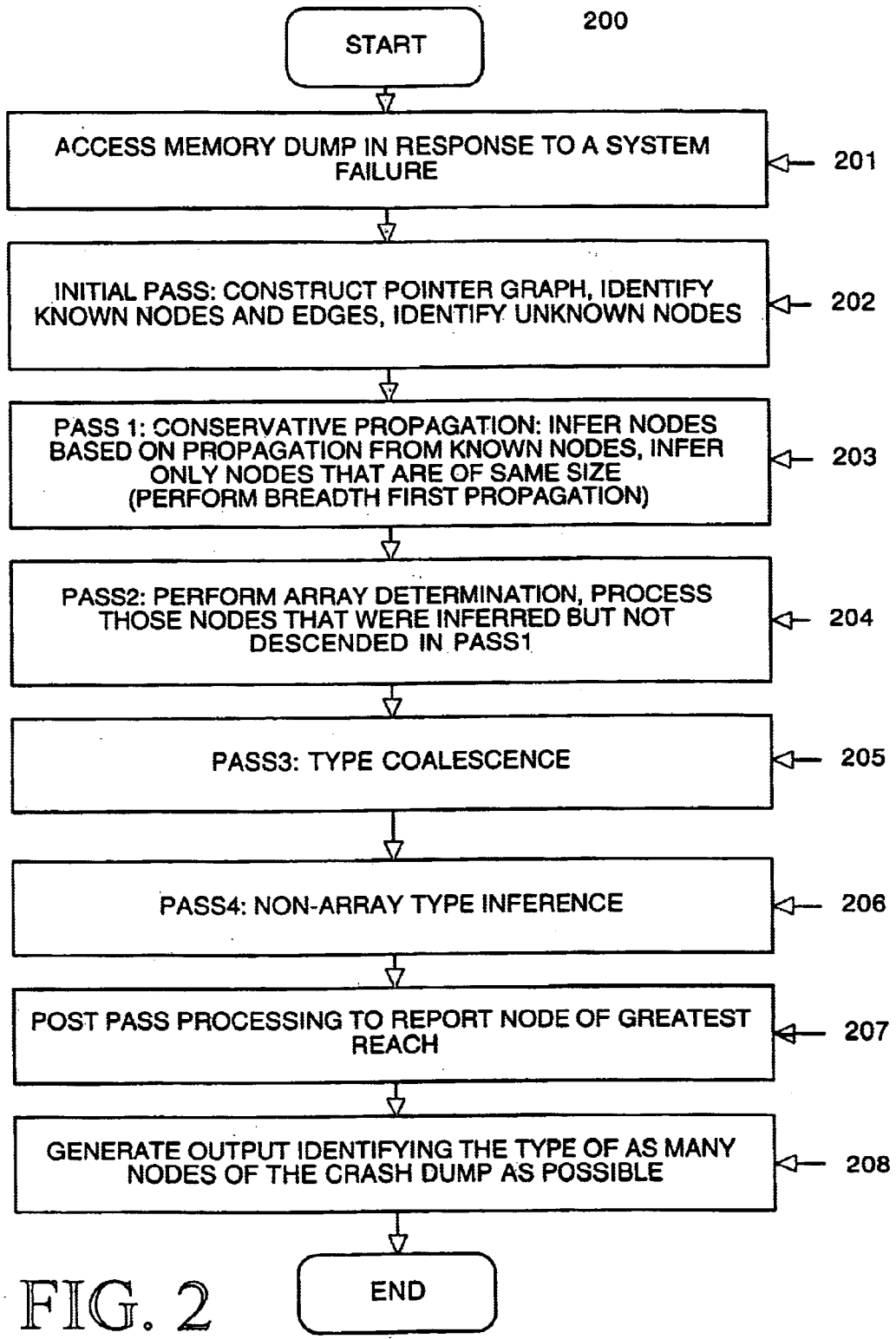
FIG. 2 is a flowchart of the passes performed for postmortem object type identification in accordance with one embodiment of the present invention.

With reference now to FIG. 2, a computer implemented flowchart of the passes performed for postmortem object type identification is shown in accordance with one embodiment of the present invention. In general, process 200 may be one embodiment that is utilized for examining a memory or crash dump.

Figure 3A:
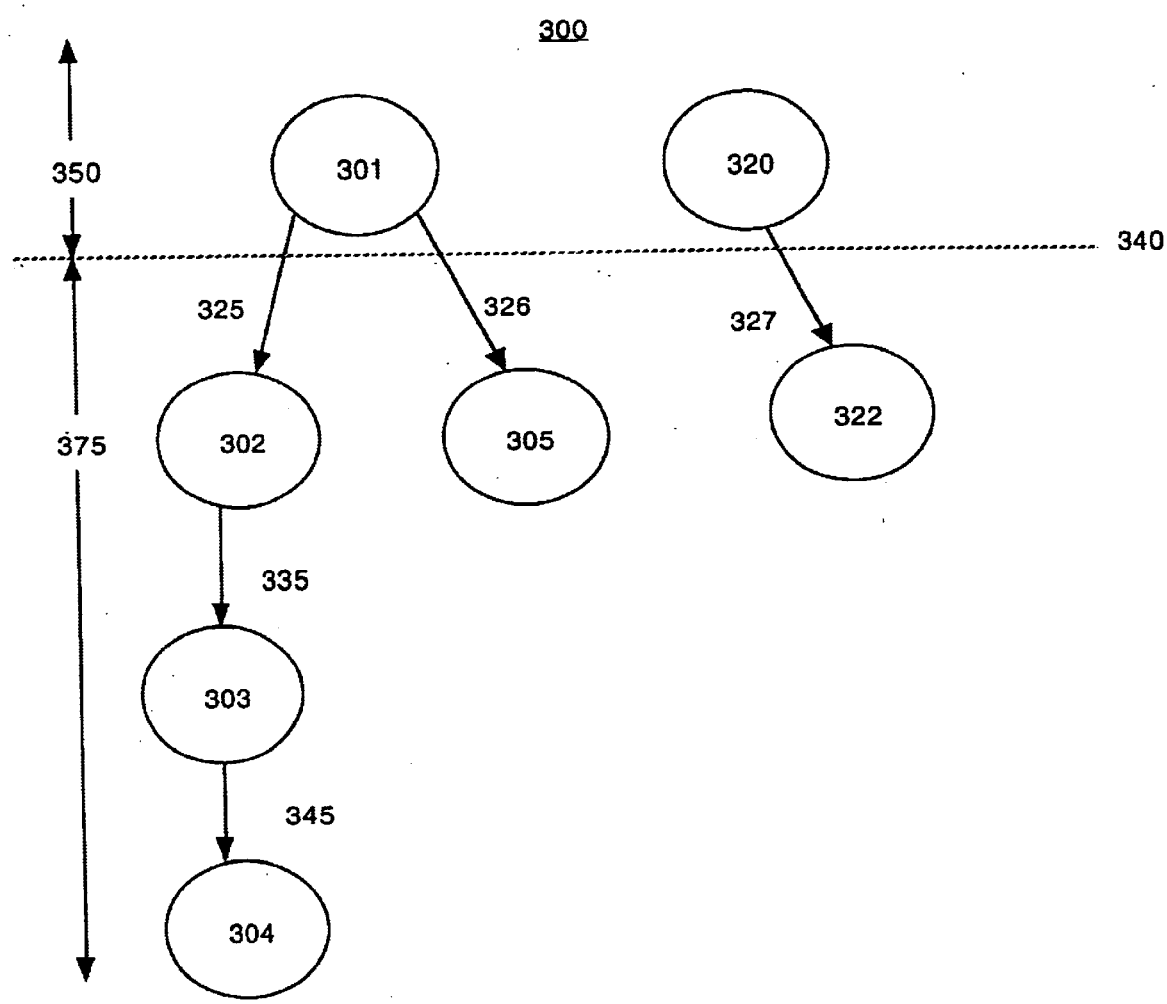
FIG. 3A is a block diagram of an embodiment of an exemplary partitioning of memory objects in accordance with an embodiment of the present invention.

With reference still to FIG. 2, and now to step 201, a memory dump is accessed in response to a system failure. For example, as shown in FIG. 3A, one method for resolving the identity of an unknown buffer in a memory or crash dump (e.g., a postmortem memory dump) is to initially lay out the objects within the memory dump into two sections (e.g., build a pointer graph). within the memory dump 300, each memory object may be a node (e.g., 301 through 322). Moreover, in one embodiment, each memory object may be dynamically allocated. Furthermore, in memory dump 300 pointers (e.g., 325 through 345) are utilized to point from one node to another.

Referring now to step 202 of FIG. 2, an initial pass through the memory crash dump is utilized to construct a pointer graph, identify known nodes and edges, and identify unknown nodes and edges. In one embodiment, each node in the graph is a memory object (e.g., either a static object form module data, or a dynamically allocated memory object), and each node's outgoing edges represent pointers from the object to other memory objects in the system. Once the graph is constructed, the process starts at nodes of known types, and uses the type information to determine the type of each pointer represented by an outgoing edge. Determining the pointer type allows us to determine the type of the edge's destination node, and therefore to iteratively continue the process of type identification. In one embodiment, this process works as long as all pointed-to objects are exactly the size of their inferred types.

For example, in FIG. 3A memory dump 300 is partitioned into two groups of memory object types (or node types). In one embodiment, a first section 350 is utilized to store (or list or enqueue) the known memory object types (e.g., 301 and 320). Furthermore, a second section 375 is used to store (or list or enqueue) the portion of unknown memory object types (e.g., 302, 303, 304, 305, and 322) in the memory dump. Additional details on an exemplary implementation of the pointer graph are set forth in commonly-owned U.S. Pat. No. 6,523,141, issued Feb. 18, 2003, Ser. No. 09/512843 filed Feb. 25, 2000, entitled "METHOD AND APPARATUS FOR POST-MORTEM KERNEL MEMORY LEAK DETECTION", which is hereby incorporated by this reference.

In one embodiment, the memory objects stored in first section 350 are nodes which may be contained within module data segments. They may also be nodes allocated from kernel memory caches of a known type. For example, these memory objects (e.g., 301 and/or 320) may be "PROC_T" type nodes allocated from the process cache. Furthermore, the memory object may be from any of a plurality of known kernel memory caches such as process from process cache, thread from thread cache, message block from message block cache, or the like. The utilization of PROC_T is merely for purposes of brevity and clarity.

With reference still to FIG. 3A, once all known objects have been recognized and queued into first section 350, each node in first section 350 may then be analyzed for pointers pointing to nodes of an unknown type in second section 375. For example, node 301 may be analyzed and pointers 325 and 326 may be processed. Specifically, the known (or inferred) type of node 301 and pointer 325's and 326's source offsets may be utilized to determine the type of pointer 325 and pointer 326. Once the pointer type has been determined, the pointer type (e.g., pointer 325) may be dereferenced to determine the destination node type (e.g., node 302). For example, if node 301 were a PROC_T, and at offset hex 38 the PROC_T has a pointer to an ANON_T, then if pointer 325 is an unknown pointer at offset hex 38, node 302 is an ANON_T.

Once the destination node type (e.g., node 302) is determined, the destination of node 302 may be added to the node type list (e.g., node 302 may be marked as an inferred memory object type and node 302 may then be transferred to a location within first section 350). In that way, node 302 is enqueued into the known node types of memory dump 300. Thus allowing for a breadth-first type of propagation for resolving the identity of node types throughout a kernel memory dump of data. In one embodiment, the kernel memory dump of data may be a postmortem crash memory dump.

Referring still to FIG. 3A, as stated herein, this initial process may be repeated for each of the known memory object types (e.g., node 320). Furthermore, after a previously unknown node type (e.g., node 302) has been determined, the inferred memory object (e.g., node 302) may then be analyzed for pointers pointing to nodes of an unknown type. For example, node 302 may be analyzed and pointer 335 may be processed. Specifically, the known (or inferred) type of node 302 and pointer 335's source offset may be utilized to determine the type of pointer 335. Once the pointer type has been determined, the pointer type (e.g., pointer 335) may be dereferenced to determine the destination node type (e.g., node 303). For example, if node 302 is an ANON_T, and at offset hex 38 the ANON_T has a pointer to a PROC_T, then if pointer 335 is an unknown pointer at offset hex 38, node 303 is a PROC_T.

Once the destination node type (e.g., node 303) is determined, the destination of node 303 may be added to the node type list (e.g., node 303 may be marked as an inferred memory object type and node 303 may then be transferred to a location within first section 350). In that way, node 303 is enqueued into the known node types of memory dump 300. This allows for a breadth-first type of propagation for resolving the identity of node types throughout a kernel memory dump of data.

The process for object type identification may be continued throughout the entire memory dump or until the desired object has been identified. For example, referring still to FIG. 3A, if node 304 is the unknown node which caused the initial buffer overrun, then after node 304 has been identified, the structure which allocated node 304 will also be known. Therefore, it may be a simple matter of evaluating the particular structure type within the system to find the cause of the initial buffer overrun. For example, in a normal system there may be 25,000 structure types, searching the system for an error caused by an unknown structure is a large and time-intense process. However, searching for an error caused by one structure is a much smaller and easier process. Specifically, 24,999 possible structure types may already be taken out of the search.

In one embodiment, the process of inferring memory object types may be more complex than the method described thus far. For example, there may be a plurality of programming nuances that may lead the process described herein to incorrectly assume (and label, or enqueue) a memory object type. That is, the process will work correctly as long as all nodes (e.g., memory objects) are exactly the size of their inferred type. However, in some programming languages (e.g., C, C++, or the like) this may not always be the case. For example, if a node is larger (or smaller) than its pointed-to type, it may be an array of objects of pointed-to type, or it may be an object of the pointed to type followed by an array of that type's last member, or it may be an object of a larger (or smaller) type that is not either of the above mentioned options.

Figure 3B:
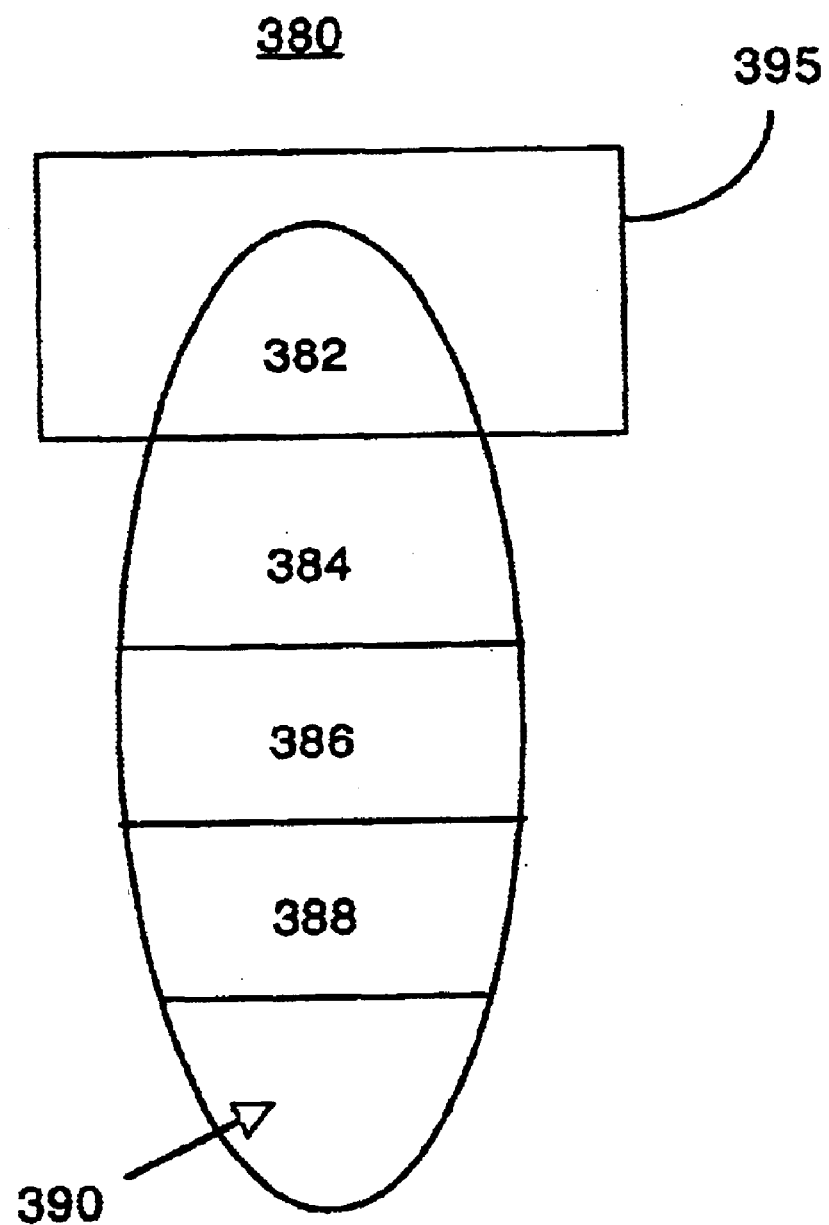
FIG. 3B is a block diagram of an exemplary method for large structures to embed smaller structures in accordance with an embodiment of the present invention.

In some cases, a programming language (e.g., C, C++, or the like) may not force a distinction between a pointer to a single object and a pointer to an array of objects. For example (as shown in FIG. 3B), "vnode_t *" may be a pointer to a single "vnode_t," or an array (e.g., 380) of "vnode_t's." Furthermore, the programming language may not perform bounds checking on array indexing. In fact, it may be possible for a structure to be implicitly followed by an array 380 of the type of the last member. For example, if a structure is allocated, an array the size of n–1 may be added to the size of the allocation. This allows the array to be referenced using a programming languages conventional array syntax without requiring an additional memory difference. ISO C99 calls the last member in such a structure the flexible array member (FAM).

In yet another programming possibility, it is possible for large structures to embed smaller structures and to pass pointers to the smaller structures to more generic subsystems. This process allows the programmer to inherit properties of one structure thereby adding an amount of functionality to the second structure. This type of programming is known as polymorphism.

Figure 4:
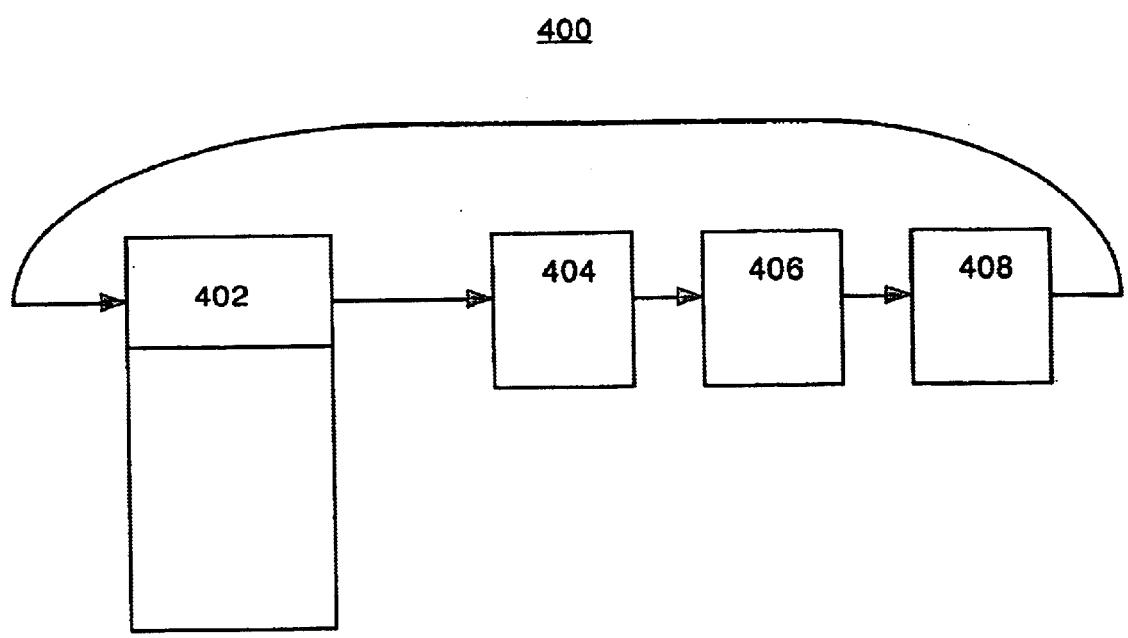
FIG. 4 is a block diagram of an exemplary method wherein a pointer of a larger structure is actually a pointer to the smaller structure in accordance with an embodiment of the present invention.

Another programming possibility may be the utilization of smaller structures acting as placeholders in data structures consisting primarily of a single larger structure. That is, instead of a pointer to the smaller structure actually being a pointer to the larger structure, a pointer to the larger structure is actually a pointer to the smaller structure. This construct is particularly important to identify when the smaller structures are in a contiguous array, by examining only the data structure of larger structures, an erroneous assumption may be that the array of smaller structures is actually an array of the larger structure. For example (with reference to FIG. 4), the smaller structure (e.g., 404, 406, and 408) consists of next and previous pointers of the larger structure type (e.g., a linked list such as 401), larger structure 401's first member 402 is made to be identical to those of the smaller structure (e.g., 404, 406, and 408). Furthermore, object 408 points back to object 402. This type of programming is often used in hash tables. This allows hash tables to be an array of the smaller structure type, thereby saving space.

Thus, with the three previously mentioned array issues, if there is a pointer to an object that is larger than the pointed-to type, it is uncertain whether the object is an array of objects of the pointed-to type, the pointed-to type followed by an array of that type's last member, or some other larger type that has not yet been recognized. Therefore, a further process of differentiating the possible node types must be utilized to ensure the correct recognition of node types throughout the memory dump. For example, if one node (e.g., node 302 of FIG. 3A) is misidentified, then this may lead to the misidentification of nodes 303, 304, and on down the chain. Thus, when the results are analyzed they may be incorrect, and the technician may be sent searching for the error in the wrong direction before resorting back to searching through the 25,000 possible structure types.

In one embodiment, a protocol such as "::typegraph" may be used to build and process node type information from a kernel memory crash dump. In order to correctly identify as many nodes as possible with a minimum of unknown nodes, in one embodiment, the process of node identification may be broken down into a plurality of passes utilized by the ::typegraph process to ensure that a node is correctly identified in context with the previously mentioned programming nuances. Furthermore, ::typegraph may retain the node type information after completion for further analysis.

With reference again to step 202 of FIG. 2, an initial pass (e.g., constructing the pointer graph) is utilized to identify known nodes and edges, and identify unknown nodes and edges. This initial pass may construct the nodes from the kmem caches and module data, and construct the edges by propagating out from the module data. For example, nodes that are in module data or known kmem caches may be marked with their known type.

With reference now to step 203 of FIG. 2, a first pass (e.g., conservative propagation) is utilized to infer nodes based on propagation from known nodes, and infers only the nodes that are of same size (e.g., perform breadth first propagation). For example, in FIG. 3A the first pass through the kernel memory crash dump may be a conservative propagation breadth-first pass from nodes of known types. As described herein, that may include any node (e.g., 301 and 320) which is within first section 350. During the first pass, if an inferred type is less than half of a node's size or larger than twice its inferred type (e.g., the phenomena described herein), the type is added to the node's typelist, but the node is not enqueued for further processing (e.g., there is no descent). For example, if during the initial evaluation of node 301, the inferred type of node 302 is less than half the actual size of node 302 then node 302 may be treated as a possible known type node 302, but node 302 will not be moved into first section 350. Therefore, the propagation of the nodes (e.g., 303 and 304) beyond node 303 will not occur. In one embodiment, each node may be marked as it is processed to guarantee halting. This first pass may continue until no further improvement is made (e.g., all known nodes have been evaluated).

With reference now to step 204 of FIG. 2, a second pass (e.g., array determination) is utilized to process nodes that were inferred but not descended to in pass one. For example, in FIG. 3A, after the completion of the first pass, the second pass may be conducted as an array determination pass.

During this evaluation, all nodes that stopped further processing during pass one are visited. For example, node 302 may be evaluated to determine if it is an array, but node 303 would not initially be evaluated since the first pass stopped at node 302. Furthermore, if the node has more than one structural interpretation (e.g., two possible structure types), the node may be polymorphic and further processing will not occur during the second pass.

To determine the presence of a flexible array member (FAM), the last member of the inferred type is checked. If the last member is an array with only a single element, it is assumed to be a FAM. However, if it is not a FAM, and the node was allocated out of an unnamed cache (e.g., a kmem__alloc__n cache) then the size of the cache and the size of the inferred type is calculated and subtracted from the size of the node. If the value is less than or equal to the size of the next smaller kernel memory (kmem) cache, it must not be an array of objects of the inferred type and processing of the node is aborted (e.g., stopped for the remainder of the second pass).

For example (with reference to FIG. 3B) cache sizes are fixed, so a request for a cache is received and the array 380 is assigned based on the smallest size that is still greater than or equal to the size requested. If a request is for 100-bytes the system may have caches of size 96-bytes or 128 bytes. Since 96-bytes is too small, the assigned array 380 may be the 128-byte cache which will include an amount of wasted space 390 (e.g., 28-bytes). When trying to solve the array issue, initially there may be a pointer to array 380 which is a pointer to a certain structure (e.g., ANON_T), with an analysis of the possible array 380 it can be calculated that there is enough room in array 380 for 4 structures (e.g., 382, 384, 386, and 388) with a portion of wasted space 390. For example, if an ANON_T were 16-bytes large then four ANON_T's would be 64-bytes. If array 380 is a 72-byte cache then a search is made for the next size smaller cache. If there is a cache of size 68-bytes then the assumption is incorrect since the allocator would not have allocated 72-bytes of memory when the 68-byte cache would have worked. In such a case, this would not be 4 ANON_T's and the structure would not be propagated as a structure of 4 ANON_T's. This step is utilized to prevent the process from making the wrong assumption.

However, if the node is assumed to be an array (either a FAM or not after the size analysis described herein), a pointer check may be used to iterate through the array checking that each hypothesized pointer member points to either null or valid memory. If the pointer check fails, it is assumed that the node is not an array of the inferred type and processing of the node is aborted (e.g., stopped for the remainder of the second pass). However, if the pointer check passes, then the node is assumed to be an array and the type is propagated using the conservative propagation methods of pass one. In one embodiment, pass two continues to iterate over all unprocessed nodes until no further improvement is made.

With reference now to step 205 of FIG. 2, a third pass (e.g., type coalescence) is utilized to process all nodes that may have more than one structural interpretation are visited. For example, in FIG. 3A during the evaluation a node that may be polymorphic and was not processed during the second pass may now be processed. In general, the third pass coalesces types by preferring structural interpretations to non-structural interpretations. For example, if a node has a pointer of type char (pointed to by caddr_t) and a pointer of type struct frotz pointing to it, the types may be coalesced into struct frotz. However, if more than one structural interpretation is present (e.g., two structural pointers pointing to a node), no coalescing will occur.

With reference now to step 206 of FIG. 2, a fourth pass (e.g., non-array type inference) is utilized. This pass is the least conservative pass, and during this evaluation it is assumed that any arrays have been determined. Therefore, all unknown nodes are processed and all incoming edges are checked. If there is only one possible structural interpretation for the unknown node, the node is assumed to be of that type and propagation continues down the branch starting again with pass one style (e.g., conservative propagation). For example, with reference to FIG. 3B, if array 380 was never resolved as an array of four objects (or two objects, or the like), then the entire array 380 is propagated simply as an object 395. In general, the fourth pass picks up nodes that are larger than their inferred type, but for which the inferred type is likely accurate. For example, a directory cache entry (struct dcentry), with its FAM of characters is typically not identified until this pass.

Figure 5:
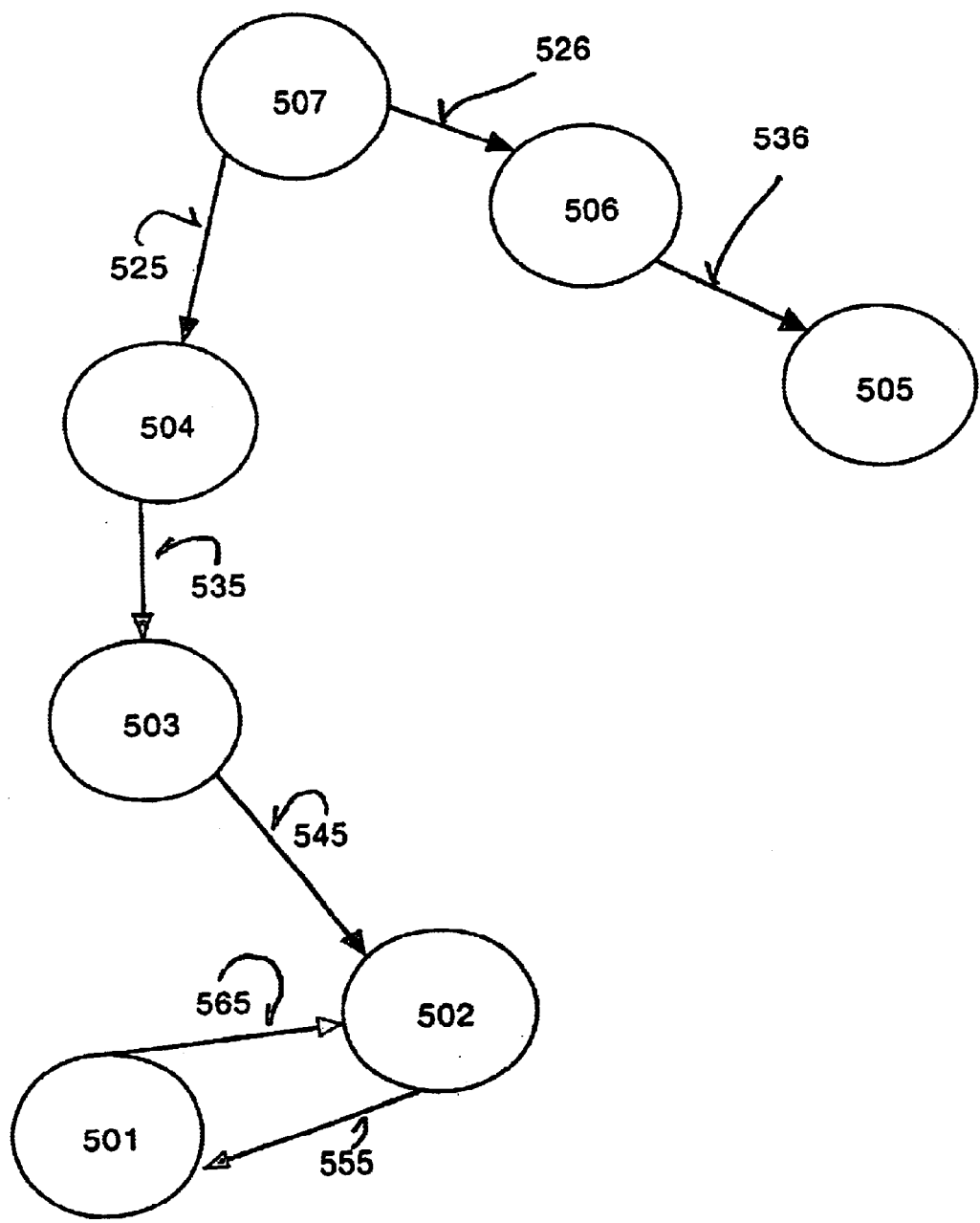
FIG. 5 is a block diagram of an exemplary system for finding the reach of an unknown node in accordance with one embodiment of the present invention.

With reference now to step 207 of FIG. 2, a post-pass may be conducted to report the unknown node of greatest reach. The post-pass may be utilized as a pass to determine unknown reach (e.g., the number of unknown nodes reachable from a given node). That is, after the overall recognition four-pass process has concluded, it may be useful to know which node is the greatest impediment to further identification. In order to select which node is the greatest impediment, unknown reach is determined in the post-pass by proceeding depth-first through a graph (e.g., graph 500 of FIG. 5). For example (with reference to FIG. 5), if node 507 is unknown then there are a six other nodes (501–506) which are also unknown. If the type of the unknown node 507 can somehow be determined a further analysis of the six other nodes may occur allowing for a much higher recognition rate. In a cycle, the first node encountered in the cycle will have the greatest reach. For example node 502 has a greater reach than node 501. In some cases, the type of the unknown node may be determined by utilizing any number of methods described herein.

Once the unknown node is identified, a function such as "::istype" may be used to manually label the type of the node. Once the node type is labeled, the program again begins to propagate using the conservative propagation methods of pass one and continuing through each of the four pass methods described herein. For example, if a nineteen-kilobyte structure is not identified, then the recognition success may be significantly reduced. However, if the structure can be identified and labeled, the overall recognition rate may have a dramatic increase (e.g., from 75% to better than 99%).

With reference now to step 207 of FIG. 2, an output identifying the type of as many nodes of the crash dump as possible may be generated. For example, as shown in FIG. 6A, an exemplary report 600 of the possible results of a processed memory dump is shown in accordance with an embodiment of the present invention. For example, a protocol such as "::typegraph" may be used to monitor the performance of each pass and provide information (e.g., report 600) on the nodes identified and the overall time elapsed. In one embodiment, the information found in ::typegraph may include which pass has been completed, how many total nodes in memory dump, unknown (unmarked), known, conjectured, conjectured fragments, known or conjectured, conflicts, time elapsed (per pass and total time), or the like.

With reference now to FIG. 6B, a protocol such as "::whattype" may be used to evaluate the type information stored by ::typegraph to determine the type of a specific node. For example, input 625 shows a request for the node type de7ae628 (e.g., node de7ae628 may be the node which caused the buffer overrun). In one embodiment, if the language in the result is "weak" (e.g., possibly, maybe, could be, or the like), ::whattype may be showing that the result is likely but not certain. However, with reference to FIG. 6C, if the language is bold (e.g., no modifier, is, certainly, or the like), ::whattype may be showing that the node is definitely known.

With reference now to FIG. 6D, a verbose version 675 of a protocol such as "::whattype" is shown. Specifically, this may include inferences, status information, the reach of the node, which node the pointer to the specific node is pointing from, or the like. The verbose version 675 of ::whattype allows a technician to see the known details of the node as well as any possible inferences made during the ::typegraph process.

Figure 7:
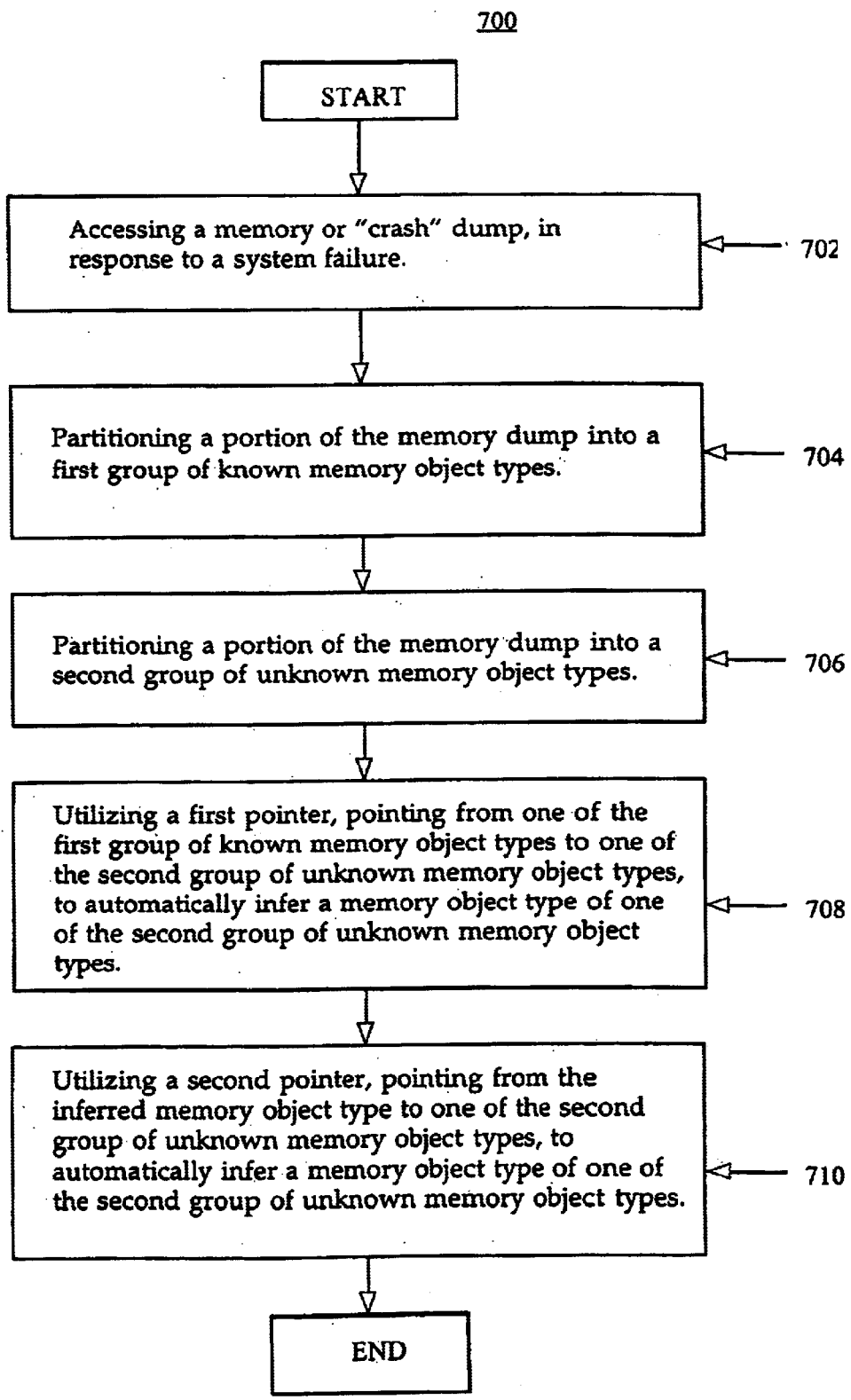
FIG. 7 is a flowchart of the steps performed for postmortem object type identification in accordance with one embodiment of the present invention.

With reference now to FIG. 7, a flowchart of the steps performed for postmortem object type identification is shown in accordance with one embodiment of the present invention.

Referring now to FIG. 3A and step 702 of FIG. 7, a memory or "crash" dump 300 is accessed. In one embodiment, the access of the memory or "crash" dump 300 may be in response to a system failure. As stated herein, memory dump 300 may be a post-mortem memory dump 300. Furthermore, the post-mortem memory dump 300 may be taken from a system that crashed due to a buffer overrun.

With reference still to FIG. 3A and now to step 704 of FIG. 7, a portion of memory dump 300 is partitioned into a first group of known memory objects. As stated herein, first group 350 may be comprised of memory objects (e.g., nodes) which may be contained within module data segments. They may also be nodes allocated from kernel memory caches of a known type. Furthermore, the memory object may be from any of a plurality of known kernel memory caches such as process from process cache, thread from thread cache, message block from message block cache, or the like. In one embodiment, the first group (or first plurality) of known nodes of the memory dump information may be identified automatically.

Referring still to FIG. 3A and now to step 706 of FIG. 7, a portion of memory dump 300 is partitioned into a second group of unknown memory objects. As stated herein, second group 375 may be comprised of memory objects (e.g., nodes) which may not be contained within module data segments. They may also be nodes allocated from kernel memory caches of an unknown type. Furthermore, the memory object may be from any of a plurality of unknown kernel memory caches.

With reference still to FIG. 3A and now to step 708 of FIG. 7, in one embodiment a first pointer, pointing from one of the first group of known memory object types to one of the second group of unknown memory object types, is utilized to automatically infer (e.g., propagate) a memory object type of one of the second group of memory object types. For example, as stated herein pointer 325 pointing from known memory object 301 to unknown memory object 302 may be utilized in conjunction with its offset and pointer type to determine the type of memory object 302. In one embodiment, this process may be performed on every known memory object (e.g., 301 and 320) in memory dump 300.

With reference still to FIG. 3A and now to step 710 of FIG. 7, in one embodiment a second pointer, pointing from the inferred memory object type (e.g., node 302) to one of the second group of unknown memory object types, is utilized to automatically infer (e.g., propagate) a memory object type of one of the second group of memory object types. For example, as stated herein pointer 335 pointing from inferred memory object 302 to unknown memory object 303 may be utilized in conjunction with its offset and pointer type to determine the type of memory object 303. In one embodiment, this process may be performed on every inferred memory object (e.g., 302 through 305 and 322) in memory dump 300. In yet another embodiment, an output containing type identifications for the known and the inferred nodes of the memory dump information may be automatically generated. Furthermore, the output may be a useful tool for determining a cause of a system failure.

II. Identification of Falsely Shared Memory Objects

By utilizing the method for postmortem object type identification and therein gaining knowledge of most or all of the node types in a system, a unique method for identifying potential false sharing. That is, an analysis of the postmortem object type identification may indicate performance problems that have not yet occurred or have not yet occurred on a noticeable level. For example, after the system crash has occurred and the postmortem object type identification has been performed on the crash dump, an analysis of the operation of the object types within the crash dump may provide insight into performance problems that were previously unknown.

For example, information may be identified about false sharing situations, before the situations may adversely effects the computing system. In general, by establishing a graph (or chart) of the type of the nodes within the memory dump, a technician may search for situations of false sharing occurring anywhere within the memory dump. For example, while the memory dump is analyzed in order to provide a specific subsystem to search for the error, a simultaneous evaluation of false sharing may be performed. Therefore, although the system may not have been detrimentally effected by any user unrealized instances of false sharing, an evaluation of the memory dump may provide instances of false sharing that may occur and may be the cause of future deleterious effects on the computing system or network. In another embodiment, the evaluation of the memory dump for false sharing may be performed at a later time than the initial search for a specific subsystem error. That is, the search for false sharing may occur simultaneously with the postmortem object type identification or it may occur later. Therefore, the technician may initially focus on the system crash problems in the present, and resolve possible conflict problems at a later, less critical time.

Figure 8:
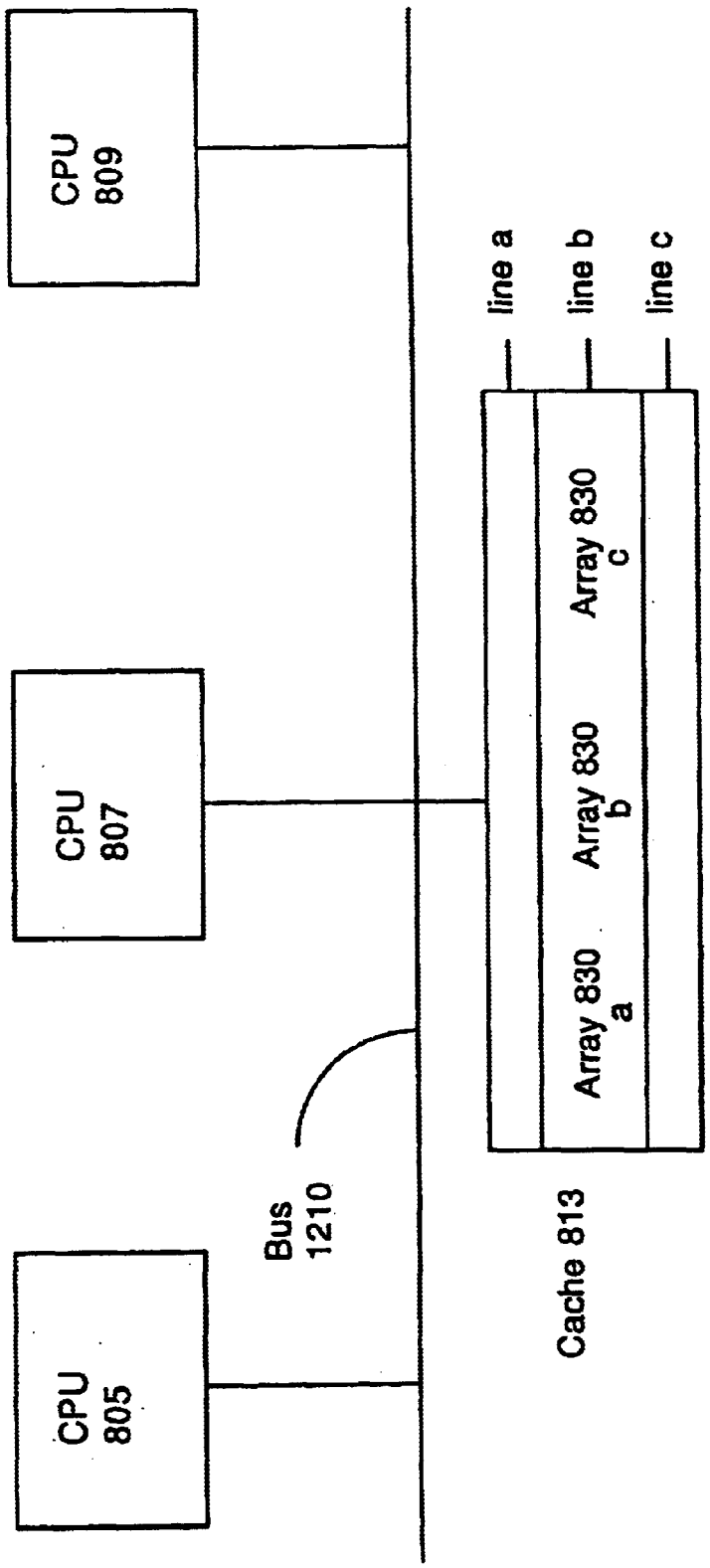
FIG. 8 is a block diagram of a caching symmetric multiprocessing (SMP) system within a network having an array with more than one element on a cache line.

With reference now to FIG. 8, a network having an array with more than one element on a cache line is shown in accordance with one exemplary example of false sharing. Specifically, system 800 shows three CPU's (e.g., 805, 807, and 809) accessing a cache 813 via a bus 1210. Any cache line (e.g., line a, b, or c) within the cache 813 may be accessed by any of the three CPU's (e.g., 805, 807, and 809). However, due to cache 813 line b containing a memory object such as an array 830 of structures (a, b, and c), a case of false sharing may be occurring.

For example, in the array of structures in cache 813 line b. One thread (e.g., CPU 805) may access a first element in the structure (e.g., array 830b), a second thread (e.g., CPU 807) may access a second element in the structure (e.g., array 830b), and a third thread (e.g., CPU 809) may access a third element in the structure (e.g., array 830c). Thus, three elements within the array 830 may be accessed at the same time. However, a deleterious effect of false sharing may occur with the above stated array structure since the element size of the array structure is less than the size of the cache line. For example, if the element size is 16 bytes but the cache line 813*b* size is 64 bytes.

Therefore, although the array structure has been designed so that the three users accessing the elements don't interfere (e.g., no fighting is done over the elements of the array), there may be fighting for the use of the single cache line 813*b*. For example, each CPU (e.g., 805, 807, and 809) may be fighting for ownership of the cache line 813*b*. This fighting degrades system performance considerably and progress may be made as though only one CPU were operating instead of multiple CPUs (e.g., three).

Figure 9:
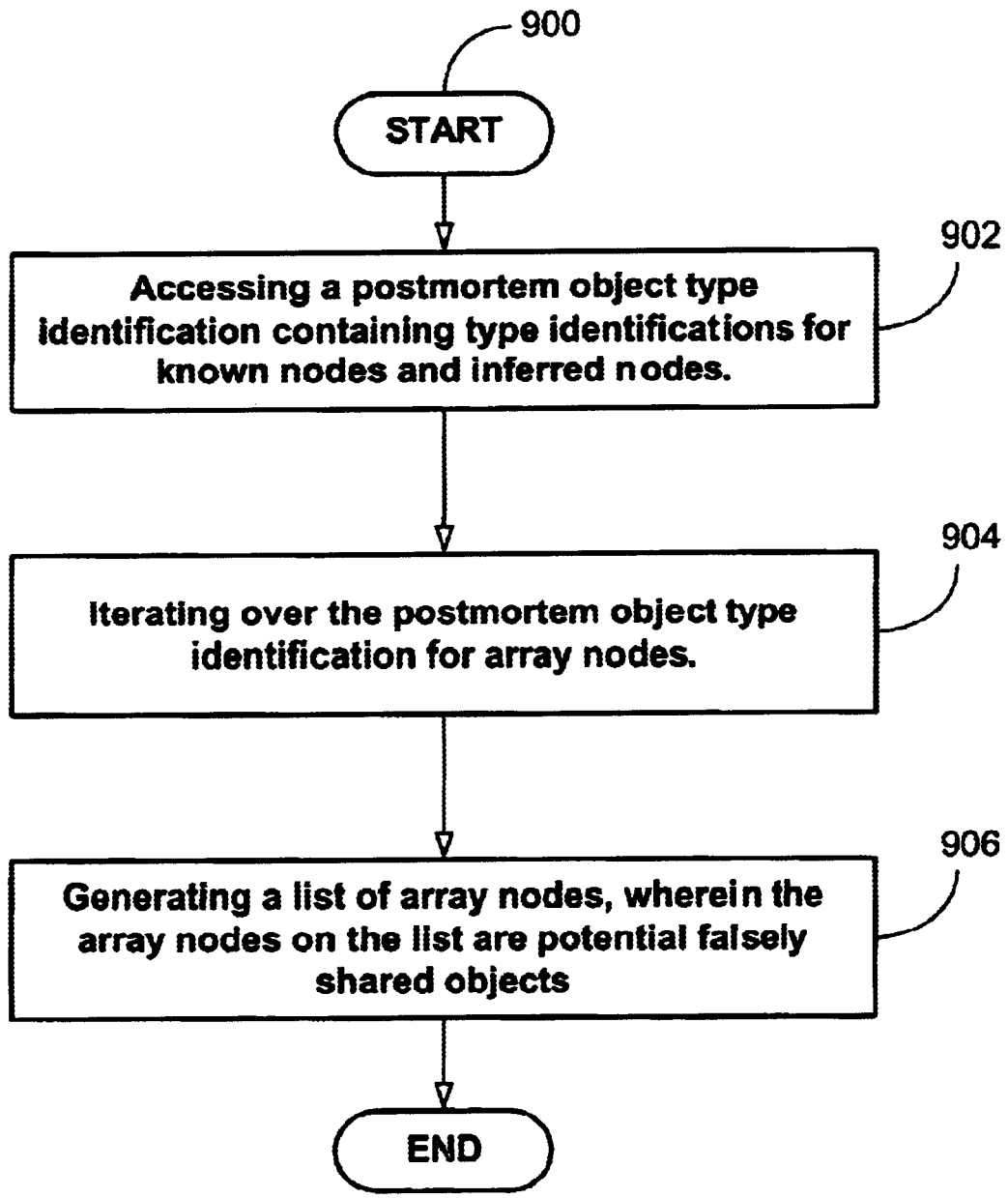
FIG. 9 is a flowchart of the steps performed for postmortem identification of falsely shared memory objects in accordance with one embodiment of the present invention.

With reference now to FIG. 9, a flowchart of the steps performed for postmortem identification of falsely shared memory objects is shown in accordance with one embodiment of the present invention. In general, the present embodiment allows a technician to utilize the postmortem type information as a mechanism for detecting previously unknown cases of false sharing. That is, the postmortem analysis may be used to analyze a system crash dump for potential performance problems.

With reference now to step 902 of FIG. 9, in one embodiment a postmortem object type identification containing type identifications for known and inferred nodes is accessed. In general, the postmortem object type identification is performed on a system crash dump as described herein. In addition, the accessing of the postmortem object type identification containing type identifications for known and inferred nodes may be performed simultaneously (e.g., the search for falsely shared objects occurs during the postmortem object type identification process), or the accessing of the postmortem object type identification containing type identifications for known and inferred nodes may be performed at a later date. For example, if the system crash is critical the technician may focus on resolving the crash related issues first, and then, at a later time, review the memory dump data and the postmortem object type identification containing type identifications for known and inferred nodes for cases of false sharing.

Referring now to step 904 of FIG. 9, in one embodiment an iteration for array nodes is performed over the postmortem object type identification. For example, after the postmortem object type identification process is run, an iteration of all the known or inferred nodes is conducted to find array nodes that satisfy at least a portion of a false sharing criteria. In one embodiment, a number of criteria may be utilized to ensure that an overwhelming number of known or inferred array nodes are not output as potential false sharing objects.

Figure 10:
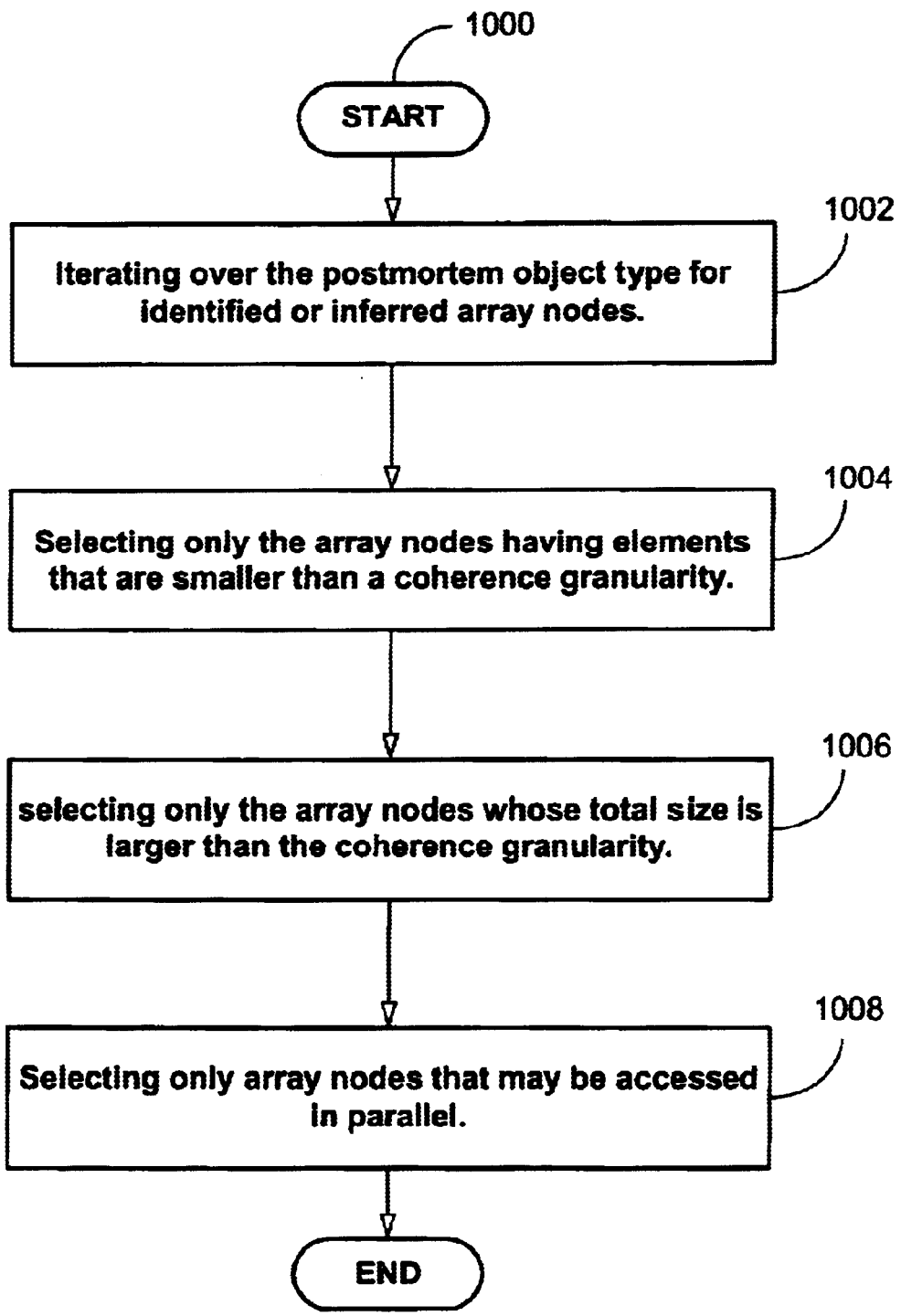
FIG. 10 is a flowchart of the steps performed for narrowing the number of possible array structures having falsely shared memory objects in accordance with one embodiment of the present invention.

With reference now to FIG. 10, a more detailed flowchart of the criteria which may be utilized during the iteration over the postmortem object type identification for array nodes is shown in accordance with one embodiment of the present invention.

With reference now to step 1002 of FIG. 10, one criteria may be that the node in question should be an array node. That is, the node is either a known array node or an inferred array node. For example, the array node may be determined to be of a C type that is an array type, or the node may be inferred to be an array in pass two of type identification as described herein. In addition, the iteration may be performed automatically after the postmortem object type identification process, or the iteration may be manually performed after the postmortem object type identification process.

With reference now to step 1004 of FIG. 10, a second criteria may be that some elements of the array structure should be smaller than the coherence granularity (e.g., cache line size). For example, during the iteration only array nodes having elements that are smaller than the coherence granularity may be placed on the list. That is, if the elements of the array are smaller than the cache line size (e.g., coherence granularity), then there is a possibility that false sharing may occur and the array node may be placed on the list for further evaluation.

With reference now to step 1006 of FIG. 10, another criteria that may be utilized is the total size of the array structure should be larger than the coherence granularity (e.g., cache line size). For example, during the iteration only array nodes whose overall size (e.g., total size of all elements within the array) is larger than the coherence granularity may be placed on the list.

With reference now to step 1008 of FIG. 10, another criteria that may be utilized during the iteration allows only array nodes which are accessed in parallel to be placed on the list. In one embodiment, identification of array nodes which are accessed in parallel is performed by determining whether or not each element of the array node has a synchronization primitive. Examples of synchronization primitives include mutex, readers lock, writers lock, condition variable, and/or semaphore.

With reference now to step 906 of FIG. 9, in one embodiment a list of the resulting array nodes is generated, wherein the array nodes on the list are potential falsely shared objects. The list may include information about the array node such as the node's address, any symbolic name for the node, node type, type size, and/or total size of the node. In one embodiment, when the iteration over the postmortem object type identification for array nodes is performed, each factor (or criteria) may be utilized independently on an array node by array node basis. In another embodiment, each factor (or criteria) may be utilized in conjunction to ensure the resulting list of array nodes does not overwhelm a technician. For example, if each criteria is utilized independently a large list of false positives may occur. Therefore, the technician may combine all of the criteria, or a selection of the criteria to narrow the results.

With reference now to FIG. 11A, an exemplary report of the possible results of a postmortem identification of falsely shared memory objects is shown in accordance with one embodiment of the present invention. In general, the false sharing process may be performed by a simple command such as "::findfalse" which may be utilized to begin the iteration process over the postmortem object type identification output. Formatted list 1100 is one embodiment for output having columns for the known or inferred array name, whether or not the array node has elements that are smaller than the cache line granularity, whether or not the array node has a structure size larger than the cache line granularity, and whether the array node can be accessed in parallel. From this list, the technician can select the array nodes to be further evaluated. Although list 1100 shows a set of column headings, the headings, outputs, and required results may be modified to include more or less criteria, show only those array nodes passing all criteria, or the like. FIG. 11A is merely one of a plethora of possible output styles which may be utilized to update a technician on the status of possible false sharing array nodes.

After the list (e.g., list 1100) of possible nodes fitting the criteria has been generated, and the desired nodes for evaluation selected, a technician may utilize the command "::whattype", shown in FIGS. 6B, 6C, and 6D, and described in detail herein, to determine the type of the node (e.g., an array of structure entry) from the list. In one embodiment, the command "::whattype" may be utilized to output the desired metrics of the array structure. For example, "::whattype" may output the node's address, any symbolic name for the node, node type, type size, and/or total size of the node.

A "::print" command may then be performed to output information about structure "entry" of the specified array. For example, the output may include the cache line size (e.g., 64 bytes) as well as the size of an element within the structure "entry" (e.g., 32 bytes). In so doing, the technician may then resolve whether a case of false sharing is or is not occurring in the specified array structure. Although the steps for selecting the information (e.g., having the user input "::whattype", "::print", or the like) is stated as being manual, it is also possible that the steps for selecting the desired information may be automated. For example, when the technician runs the postmortem type object identification, any false sharing array nodes which fit within the desired criteria may also be output (including "::whattype" information) with the resulting postmortem object type output. In another embodiment, when the "::findfalse" is initiated, the final output may include "::whattype" information as well as which criteria metrics were utilized to obtain the results.

With reference now to FIG. 11B, another exemplary report 1120 of the possible results of a postmortem identification of falsely shared memory objects is shown in accordance with one embodiment of the present invention. Column 1140 identifies the address, column 1130 identifies the inferred type and column 1125 identifies the size information.

Figure 12:
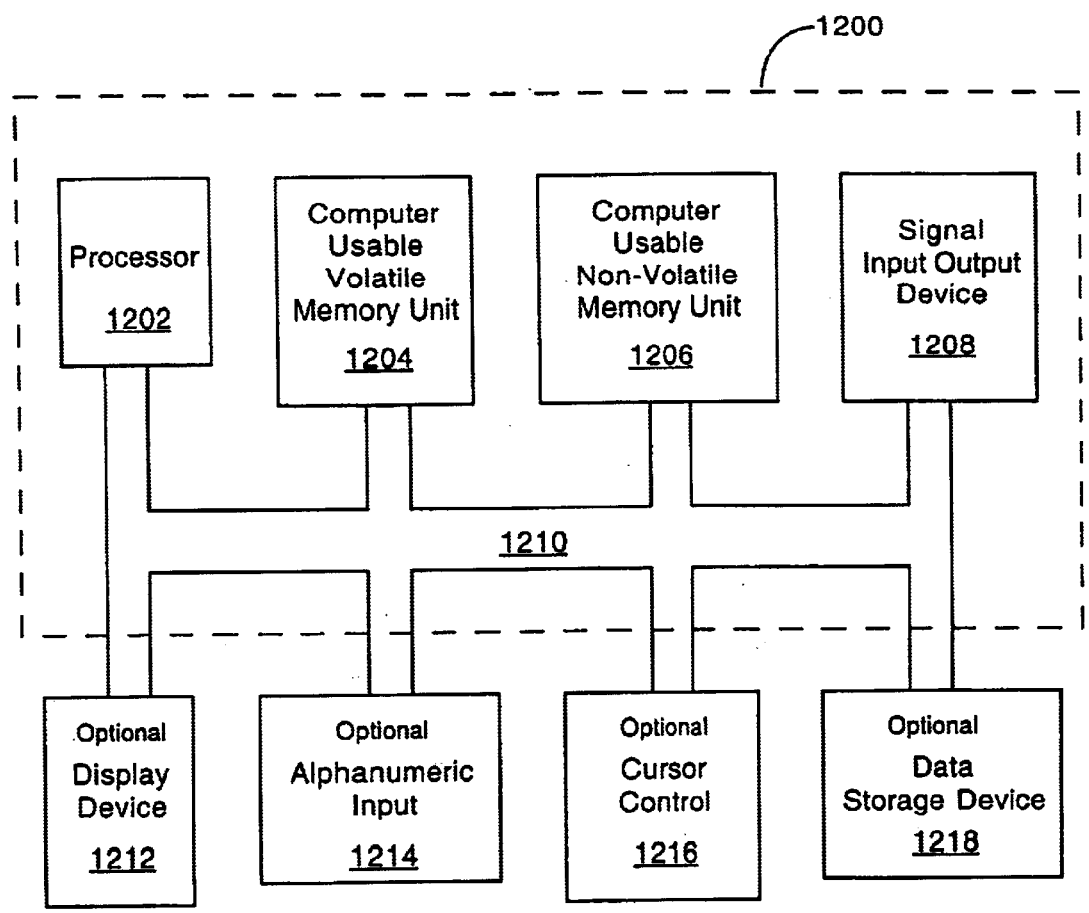
FIG. 12 is a block diagram of an embodiment of an exemplary computer system used in accordance with the present invention.

With reference now to FIG. 12, a block diagram of an embodiment of an exemplary computer system 1200 used in accordance with the present invention. It should be appreciated that system 1200 is not strictly limited to be a computer system. As such, system 1200 of the present embodiment is well suited to be any type of computing device (e.g., server computer, portable computing device, desktop computer, mobile phone, pager, personal digital assistant, etc.). Within the following discussions of the present invention, certain processes and steps are discussed that are realized, in one embodiment, as a series of instructions (e.g., software program) that reside within computer readable memory units of computer system 1200 and executed by a processor(s) of system 1200. When executed, the instructions cause computer 1200 to perform specific actions and exhibit specific behavior that is described in detail herein.

Computer system 1200 of FIG. 12 comprises an address/data bus 1210 for communicating information, one or more central processors 1202 coupled with bus 1210 for processing information and instructions. Central processor unit(s) 1202 may be a microprocessor or any other type of processor. The computer 1200 also includes data storage features such as a computer usable volatile memory unit 1204 (e.g., random access memory, static RAM, dynamic RAM, etc.) coupled with bus 1210 for storing information and instructions for central processor(s) 1202, a computer usable non-volatile memory unit 1206 (e.g., read only memory, programmable ROM, flash memory, EPROM, EEPROM, etc.) coupled with bus 1210 for storing static information and instructions for processor(s) 1202. System 1200 also includes one or more signal generating and receiving devices 1208 coupled with bus 1210 for enabling system 1200 to interface with other electronic devices and computer systems. The communication interface(s) 1208 of the present embodiment may include wired and/or wireless communication technology.

Optionally, computer system 1200 may include an alphanumeric input device 1214 including alphanumeric and function keys coupled to the bus 1210 for communicating information and command selections to the central processor(s) 1202. The computer 1200 can include an optional cursor control or cursor directing device 1216 coupled to the bus 1210 for communicating user input information and command selections to the central processor(s) 1202. The cursor-directing device 1216 may be implemented using a number of well known devices such as a mouse, a track-ball, a track-pad, an optical tracking device, and a touch screen, among others. Alternatively, it is appreciated that a cursor may be directed and/or activated via input from the alphanumeric input device 1214 using special keys and key sequence commands. The present embodiment is also well suited to directing a cursor by other means such as, for example, voice commands.

The system 1200 of FIG. 12 may also include one or more optional computer usable data storage devices 1218 such as a magnetic or optical disk and disk drive (e.g., hard drive or floppy diskette) coupled with bus 1210 for storing information and instructions. An optional display device 1212 is coupled to bus 1210 of system 1200 for displaying video and/or graphics. It should be appreciated that optional display device 1212 may be a cathode ray tube (CRT), flat panel liquid crystal display (LCD), field emission display (FED), plasma display or any other display device suitable for displaying video and/or graphic images and alphanumeric characters recognizable to a user.

Thus, the present invention provides, in various embodiments, a method and system for postmortem identification of falsely shared memory objects in a memory or "crash" dump. Furthermore, the present invention provides a method and system for postmortem identification of falsely shared memory objects which finds false sharing before it noticeably affects the operating system. Additionally, the present invention provides a method and system for postmortem identification of falsely shared memory objects which is cost efficient and time saving.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

What is claimed is:

1. A computer implemented method for utilizing postmortem object type identification to identify falsely shared memory objects comprising:
   a) accessing a postmortem object type identification containing type identifications for known nodes and inferred nodes;
   b) iterating over said postmortem object type identification for known nodes and inferred nodes which are identified as array nodes; and
   c) generating a list of said array nodes, wherein the array nodes on said list are potential falsely shared objects.

2. The method as recited in claim 1 wherein the postmortem object type identification is performed on a system crash dump.

3. The method as recited in claim 1 wherein said b) further comprises:

placing array nodes having elements that are smaller than a coherence granularity on said list.

4. The method as recited in claim 3 wherein said b) further comprises:

placing array nodes whose total size is larger than the coherence granularity on said list.

5. The method as recited in claim 4 wherein said b) further comprises:

placing array nodes which are accessed in parallel on said list.

6. The method as recited in claim 5 wherein array nodes which are accessed in parallel contain a synchronization primitive.

7. The method as recited in claim 6 wherein the synchronization primitive is selected from the group consisting of mutex, readers lock, writers lock, condition variable, and semaphore.

8. The method as recited in claim 1 wherein the list includes information selected from the group consisting of the array nodes address, symbolic name, type, type size, and total size which is utilized to more efficiently reassign computer resources.

9. A computer system comprising:

a bus;

a memory unit coupled with said bus; and a processor coupled with said bus, said processor for executing a method for utilizing postmortem identification to identify falsely shared memory objects comprising:

a) accessing a memory dump;

b) automatically performing postmortem object type identification on said memory dump;

c) generating an output containing type identifications for known nodes and inferred nodes of said memory dump;

d) iterating over said output containing type identifications for known nodes and said inferred nodes for nodes which are identified as array nodes; and e) outputting a list of said array nodes, wherein the array nodes on said list are potential falsely shared objects.

10. The computer system as recited in claim 9 wherein the memory dump is a system crash dump.

11. The computer system as recited in claim 9 wherein said d) further comprises:

selecting array nodes having elements that are smaller than a coherence granularity for said list.

12. The computer system as recited in claim 11 wherein said d) further comprises:

selecting array nodes whose total size is larger than the coherence granularity for said list.

13. The computer system as recited in claim 12 wherein said d) further comprises:

selecting array nodes which are accessed in parallel for said list.

14. The computer system as recited in claim 13 wherein array nodes which are accessed in parallel contain a synchronization primitive.

15. The computer system as recited in claim 14 wherein the synchronization primitive is selected from the group consisting of mutex, readers lock, writers lock, condition variable, and semaphore.

16. The computer system as recited in claim 9 wherein the list includes information selected from the group consisting of the array nodes address, symbolic name, type, type size, and total size which is utilized to more efficiently allocate computer resources.

17. A computer-usable medium having computer-readable program code embodied therein for causing a computer system to perform a method of identifying false sharing array nodes comprising:

a) accessing memory dump information from a system crash dump in response to a system failure;

b) automatically generating an output containing type identifications for known nodes and inferred nodes of said memory dump information;

c) automatically iterating over said known nodes and said inferred nodes for nodes identified as array nodes; and d) automatically outputting a list of said array nodes, wherein the array nodes on said list are potential falsely shared objects.

18. The computer-usable medium as recited in claim 17 wherein said c) further comprises:

selecting array nodes having elements that are smaller than a coherence granularity for said list.

19. The computer-usable medium as recited in claim 18 wherein said c) further comprises:

selecting array nodes whose total size is larger than the coherence granularity for said list.

20. The computer-usable medium as recited in claim 19 wherein said c) further comprises:

selecting array nodes which are accessed in parallel for said list.

21. The computer-usable medium as recited in claim 20 wherein array nodes which are accessed in parallel contain a synchronization primitive.

22. The computer-usable medium as recited in claim 21 wherein the synchronization primitive is selected from the group consisting of mutex, readers lock, writers lock, condition variable, and semaphore.

23. The computer-usable medium as recited in claim 17 wherein the list includes information selected from the group consisting of the array nodes address, symbolic name, type, type size, and total size which is utilized to more efficiently allocate computer resources.

* * * * *